United States Patent
Walton et al.

(10) Patent No.: US 11,184,477 B2
(45) Date of Patent: Nov. 23, 2021

(54) GAPLESS AUDIO COMMUNICATION VIA DISCOURSE GAP RECOVERY MODEL

(71) Applicant: INTERNATIONAL BUSINESS MACHINES CORPORATION, Armonk, NY (US)

(72) Inventors: Kaleb Walton, Byron, MI (US); Aaron T. Wodrich, Buckeye, AZ (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/563,032

(22) Filed: Sep. 6, 2019

(65) Prior Publication Data
US 2021/0075906 A1 Mar. 11, 2021

(51) Int. Cl.
*H04M 3/22* (2006.01)
*H04M 3/24* (2006.01)
*H04M 3/493* (2006.01)
*G10L 15/22* (2006.01)
*G10L 17/22* (2013.01)
*G06N 20/00* (2019.01)

(52) U.S. Cl.
CPC .......... *H04M 3/2281* (2013.01); *G06N 20/00* (2019.01); *G10L 15/22* (2013.01); *G10L 17/22* (2013.01); *H04M 3/2236* (2013.01); *H04M 3/247* (2013.01); *H04M 3/4936* (2013.01)

(58) Field of Classification Search
CPC .. H04M 3/2281; H04M 3/4936; H04M 3/247; H04M 3/2236; G06N 20/00; G10L 17/22; G10L 15/22
See application file for complete search history.

(56) References Cited

U.S. PATENT DOCUMENTS

| 8,515,748 B2 | 8/2013 | Gangemi et al. |
| 9,666,204 B2 | 5/2017 | Manjunath et al. |
| 9,880,803 B2 | 1/2018 | Brown |

(Continued)

FOREIGN PATENT DOCUMENTS

KR 101827670 B1 2/2018

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Minjung Kim
(74) *Attorney, Agent, or Firm* — Robert D. Bean

(57) ABSTRACT

According to one embodiment, a method, computer system, and computer program product for detecting and repairing gaps within a call is provided. The present invention may include requesting a personal discourse gap recovery model (PDGRM) for participants in a call, where the PDGRM may be a machine learning model that models a user's speech patterns based on word collocation, dictionary, and speaking rate. The present invention may further comprise detecting one or more gaps in the call based on network connectivity, inserting an audio delay into the call, constructing repaired dialogue to fill at least one of the one or more gaps in the call based on the PDGRM, and inserting the repaired dialogue into the call.

17 Claims, 8 Drawing Sheets

(56) References Cited

U.S. PATENT DOCUMENTS

| | | | |
|---|---|---|---|
| 2010/0198594 A1* | 8/2010 | Gangemi | G10L 13/00 |
| | | | 704/235 |
| 2014/0343948 A1* | 11/2014 | Maes | H04L 41/00 |
| | | | 704/270.1 |
| 2015/0058006 A1* | 2/2015 | Proux | G10L 15/26 |
| | | | 704/235 |
| 2017/0180275 A1* | 6/2017 | Krinsky | H04L 1/205 |
| 2018/0018962 A1* | 1/2018 | Ljolje | G10L 13/027 |
| 2019/0215542 A1* | 7/2019 | Gandhi | H04N 21/234 |

OTHER PUBLICATIONS

Hu et al., "An Example-Based Study on Chinese Word Segmentation Using Critical Fragments", Natural Language Processing—IJCNLP 2004, LNAI 3248, First International Joint Conference, Hainan Island, China, Mar. 2004, Revised Selected Papers, pp. 714-722, 2005.

* cited by examiner

GAPLESS AUDIO COMMUNICATION VIA DISCOURSE GAP RECOVERY MODEL

BACKGROUND

The present invention relates, generally, to the field of computing, and more particularly to digital telecommunications.

The Information Age has brought with it many different innovations, chief among which may be the advent of the internet and digital communication on a wide scale. The field of digital telecommunications is concerned with the software and hardware for encoding signals as a set of discrete values and propagating these signals to a remote host over a telecommunications infrastructure. This technology is the basis for many cornerstones of daily life, such as social media platforms, web conferencing, digital audio communications devices, messaging applications, et cetera.

SUMMARY

According to one embodiment, a method, computer system, and computer program product for detecting and repairing gaps within a call is provided. The present invention may include requesting a personal discourse gap recovery model (PDGRM) for participants in a call, where the PDGRM may be a machine learning model that models a user's speech patterns based on word collocation, dictionary, and speaking rate. The present invention may further comprise detecting one or more gaps in the call based on network connectivity, inserting an audio delay into the call, constructing repaired dialogue to fill at least one of the one or more gaps in the call based on the PDGRM, and inserting the repaired dialogue into the call.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
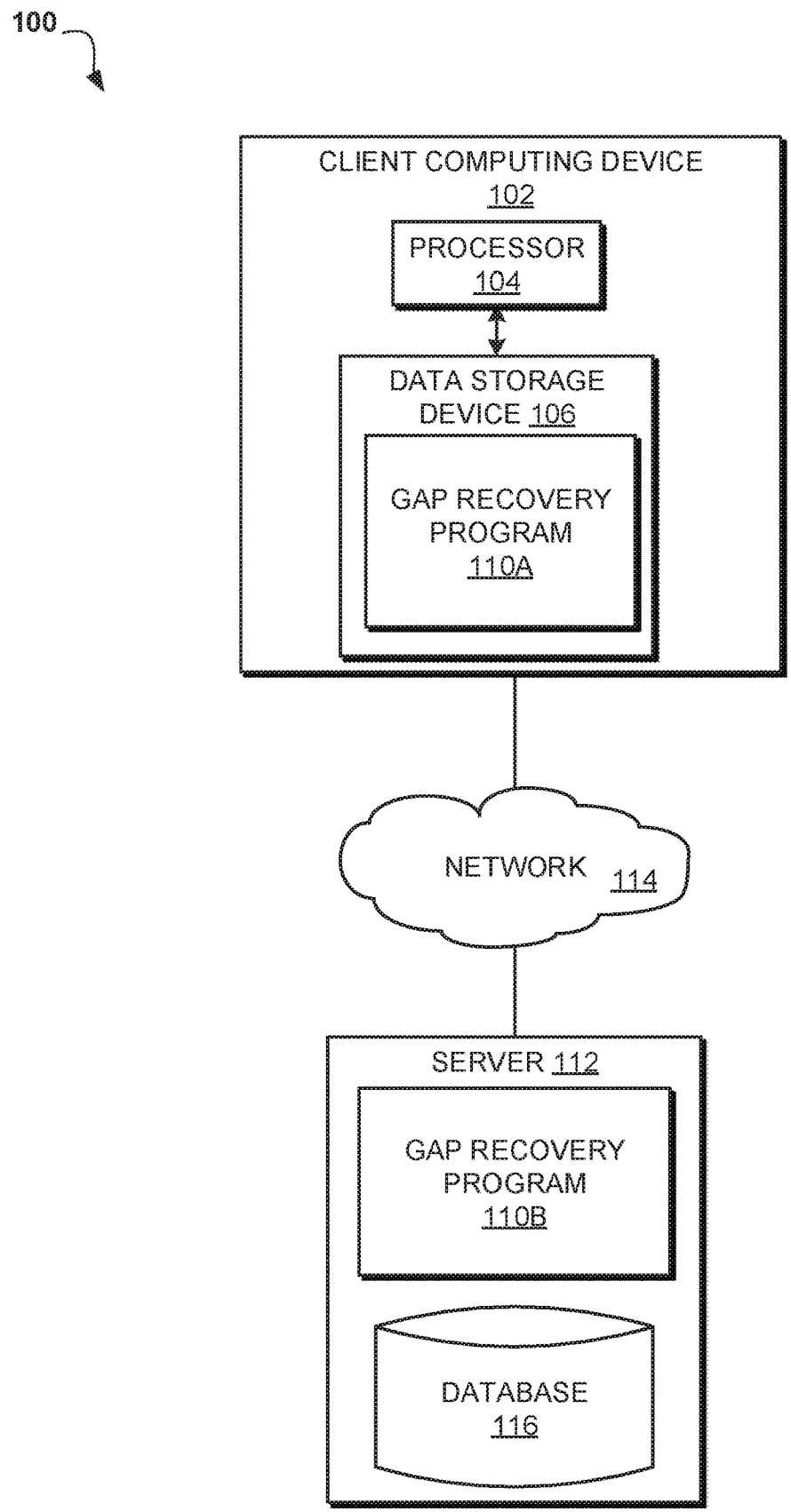
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital telecommunications. The following described exemplary embodiments provide a system, method, and program product to, among other things, utilize a trained machine learning model to identify and repair gaps in a call. Therefore, the present embodiment has the capacity to improve the technical field of digital telecommunications by allowing users to communicate smoothly and clearly despite interruptions in the communications signal.

As previously described, the Information Age has brought with it many different innovations, chief among which may be the advent of the internet and digital communication on a wide scale. The field of digital telecommunications is concerned with the software and hardware for encoding signals as a set of discrete values and propagating these signals to a remote host over a telecommunications infrastructure. This technology is the basis for many cornerstones of daily life, such as social media platforms, web conferencing, digital audio communications devices, messaging applications, et cetera.

When communicating via cellular telephones, web conferences and other digital audio communication devices, inevitably there is dropout due to connectivity and other issues that result in audio gaps that severely disrupt natural discourse. As such, it may be advantageous to, among other things, implement a system that derives a Discourse Gap Recovery Model (DGRM) for a user which can be used to fill in gaps in conversations communicated by the user during a cellular telephone call, web conference or other digital voice communication, which can then be used to recover the gaps in audio, rendering gapless audio for the listener. Furthermore, it may be advantageous to implement a system that may repair gaps in a user's conversation even in the absence of network connectivity.

According to one embodiment, the invention is a system to conduct an analysis of the prior discourse of a user, construct a Personal Discourse Gap Recovery Model (PDGRM) based on the analyzed discourse, and use the output of the PDGRM to provide a discourse gap recovery mechanism.

In some embodiments, the prior discourse of the user may be spoken conversations conducted by the user at an earlier time, recorded in the form of audio, or in the form of a text-based transcript. In embodiments where prior discourse takes the form of a text-based transcript, the prior discourse may be annotated with information representing temporal dimensions of the spoken conversation, such as the duration of the gap between each word, current time at intervals during the conversation, time each word or sentence took to say, et cetera.

In some embodiments, the system may perform analysis of the prior discourse in order to extract the rate at which a user speaks, for example in the form of words spoken per second; the speaking rate may be extracted from the audio or from annotations attached to the text-based transcript. Additionally, in some embodiments, the system may perform analysis on the prior discourse to extract word collocation information. Word collocation information may comprise which words appear adjacent to the subject word in a sentence. While some embodiments may employ one-word collocations, others may involve multiple-word collocations; for instance, an embodiment may analyze for three-word collocations, where words appearing within three words of the subject word are recorded. The example below illustrates a JSON message structure depicting a discourse to be analyzed and mined; each entry in the array represents a turn in the discourse, with spoken turn duration captured in milliseconds:

```
[
    {
        "words": "yes this is ms mary smith calling may i speak to mr roberts please",
        "durationMillis": 2323
    },
    {
        "words": "uhm actually this call is rather urgent we spoke yesterday about a billing problem that mr roberts mentioned
            did he leave any information with you",
        "durationMillis": 4591
    },
    ... many additional records
]
```

In an additional example provided below, an analysis algorithm that returns the PDGRM and identifies three word collocation data and a speaking rate of words per second may look as follows:

```
var discourse = getDiscourseFromDatabase( ) // Figure 1 as example data structure
var analysis = analyze(discourse) // Function below
function analyze(discourse) {
    var model = { }
    // Derive spoken words per second
    var wordsPerSecondValues = [ ]
    for (var entry in discourse) {
        wordsPerSecondValues.push(getWordsPerSecondFromEntry(entry))
    }
    model["wordsPerSecond"] = total(wordsPerSecondValues) / count(wordsPerSecondValues)
    // Derive word collocations
    var collocations = {
        "right3Word": [ ],
        "right2Word": [ ],
        "right1Word": [ ],
        "left3Word": [ ],
        "left2Word": [ ],
        "left1Word": [ ]
    }
    for (var entry in discourse) {
        collocations["right3Word"].push(deriveCollocations(entry, "right", 3)) // Derives right 3 word collocations from entry
        collocations["right2Word"].push(deriveCollocations(entry, "right", 2))
        collocations["right1Word"].push(deriveCollocations(entry, "right", 1))
        collocations["left3Word"].push(deriveCollocations(entry, "left", 3))
        collocations["left2Word"].push(deriveCollocations(entry, "left", 2))
        collocations["left1Word"].push(deriveCollocations(entry, "left", 1))
    }
    model["collocations"] = collocations
    return model
}
```

In some embodiments, the PDGRM may be a machine learning model containing entries based on the analyzed discourse, and which accepts an input in the form of training data and provides an output in the form of a user's speech information. Each PDGRM may pertain to a single user, and may contain the dictionaries, collocations, and speaking rate of a person. As such, the PDGRM may generally serve to represent the basic model for the user's speech pattern, including the speed at which the user speaks and the words that the user employs. Below is an example of a JSON message structure depicting the PDGRM that results from the analysis of the training data:

```
{
    "wordsPerSecond": 5.8,
    "collocations": {
        "right3Word": [
            {
                "sourceWords": "yes this is",
                "collocatedWord": "ms",
                "count": 1
            },
            {
                "sourceWords": "this is ms",
                "collocatedWord": "janice",
                "count": 1
            },
            ... many additional collocations
        ],
        "right2Word": {...},
        "right1Word": [
            {
                "sourceWords": "yes",
                "collocatedWord": "this",
                "count": 1
            },
            {
                "sourceWords": "this",
                "collocatedWord": "is",
                "count": 1
```

```
        },
        {
            "sourceWords": "is",
            "collocatedWord": "he",
            "count": 2
        },
        ... many additional collocations
        ],
        "left3Word": {...},
        "left2Word": {...},
        "left1Word": {...}
    }
}
```

In some embodiments, for example where a fully trained PDGRM for a user is available, the system may create a discourse gap recovery function, or DGRF, based on the PDGRM. The DGRF may be a software component which accepts the PDGRM of a user, as well as recorded discourse from a recent or in-progress conversation where the system identifies gaps; the DGRF may analyze the discourse, utilize the conversational model of the user as represented by the PDGRM to extrapolate one or more words that the user might have said based on the duration of the gap and the discourse of the user prior to, and possibly subsequent to, the gap, and insert those words into the conversation. For example, presented below is an example of discourse with gaps, in the form of a JSON structure:

```
[
    {
        "words": "hello how"
    },
    {
        "gapInMillis": 231
    },
    {
        "words": "doing today"
    }
]
```

The DGRF may repair this discourse with gaps using the PDGRM to produce a repaired discourse with no gaps, an example of which is provided below:
 var pdgrm=getTrainedPDGRM( )
 var discourseWithGaps=getDiscourseWithGaps FromCommunicationsSystem( )
 var repairedDiscourseWithoutGaps=callDGRF(discourseWithGaps, pdgrm)
 print(repairedDiscourseWithoutGaps)//prints "hello how are you doing today"

In embodiments, the DGRF may further apply a gap recovery filter to audio in an ongoing call between the user and one or more participants to create a delay between when the client computing device 102 receives the audio and when it is output to a user or participant in the call, in order to give the system time to identify the gap, repair the audio, and splice the repaired audio into the call.

In some embodiments, the system may identify a gap in the discourse by monitoring connection information of a client device, for example during an audio call, and inferring from the connection information when reception has been lost. For instance, the system may identify a gap where network activity, such as percentage of packet loss, hits a threshold, where the threshold is a level of network activity that could represent a loss in connection sufficient to create a gap in the conversation. The system may determine the threshold based on historical data, supplied/adjusted from a remote location, provided by a user, et cetera. In some embodiments, the system may prompt the user for call quality feedback or feedback on the presence of gaps in the call to adjust the threshold or otherwise improve gap identification. In some embodiments, the system may monitor the audio from the call for gaps. The system may infer the presence of a gap if the audio goes silent, or where the user goes silent, for more than a threshold duration, where the threshold duration may be determined based on information inferred from or contained within the user's PDGRM, for instance the user's average speaking rate or the average duration of silence between words. In some embodiments, the system may identify gaps based on a combination of network activity and audio gaps, for instance by flagging gaps where both network activity reached a threshold level, and where audio levels went silent for more than a threshold duration.

In some embodiments the PDGRM may be bound to a database. In such embodiments, discourse with turn and timing annotations may be used as training data, along with analysis results including average words per second and word collocation matrices. This training data may be mapped to database tables. The database may be populated using known techniques of dictating dialogues from voice communication. The only voice included in the dictation may belong to the user to which the Personal Discourse Gap Recovery Model pertains, to create a model that accurately represents the user's speech patterns, including wording and speed.

While the provided model has been herein defined primarily with reference to English communications in JSON formats, and in particular contexts, one skilled in the arts would understand that the model may be generalized for use in one-on-one and group communication settings, across multiple languages and with any digital communication system. The model is applicable in digital communication context where text-corpora can be derived from discourse and used to train a DGRM for a user. The digital communication context may include cellular telephones, web conferences, video chat, real-time support, live web voice chat, etc. Additionally, depending on the form of discourse in the user's text-corpora, the digital communications context may include both formal and informal language forms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize a trained machine learning model to identify and repair gaps in a call.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a gap recovery program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program, accessing a network, and hosting or accessing an audio call between a user and one or more additional participants. As will be discussed with reference to FIG. 7, the client computing device 102 may include internal components 702a and external components 704a, respectively.

The server computer 112 may be a laptop computer, netbook computer, personal computer (PC), a desktop computer, or any programmable electronic device or any network of programmable electronic devices capable of hosting and running a gap recovery program 110B and a database 116 and communicating with the client computing device 102 via the communication network 114, in accordance with embodiments of the invention. As will be discussed with reference to FIG. 7, the server computer 112 may include internal components 702b and external components 704b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the gap recovery program 110A, 110B may be a program enabled to utilize a trained machine learning model to identify and repair gaps in a call. The gap recovery program 110A, 110B may be located on client computing device 102 or server 112 or on any other device located within network 114. To provide uninterrupted service during network interruption, at least a subset of elements of gap recovery program 110A, 110B may be located on client computing device 102. The gap recovery may also be distributed in its operation over multiple devices, such as client computing device 102 and server 112. For example, in some embodiments, the PDGRMs of Users A-Z may be located on server 112, and the gap recovery program 110A, 110B may be operated on User A's client computing device 102 and User B's client computing device 102; upon initiation of a call by User A to User B using the user's respective client computing devices 102, the gap recovery program 110A, 110B may send the PDGRM of User A to User B's client computing device 102 from server 112, and may send the PDGRM of User B to User A's client computing device 102 from server 112. The elements of gap recovery program 110A, 110B running on the client computing devices 102 may repair the gaps according to the local copy of the other user's PDGRM, and may upload the discourse, gaps, and other information potentially useful as training data to the PDGRMs in server 112. The gap recovery method is explained in further detail below with respect to FIG. 2.

Figure 2:
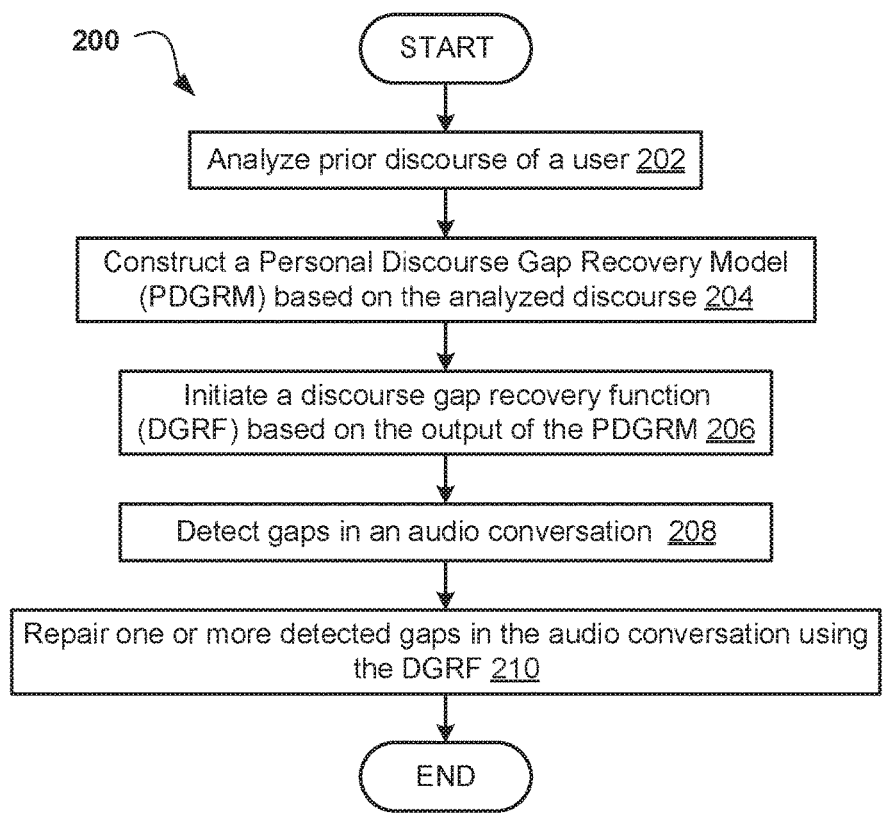
FIG. 2 is an operational flowchart illustrating a gap recovery process according to at least one embodiment.

Referring now to FIG. 2, an operational flowchart illustrating a gap recovery process 200 is depicted according to at least one embodiment. At 202, the gap recovery program 110A, 110B analyzes the prior discourse of the user. The analysis process is explained in further detail below with respect to FIG. 3.

At 204, the gap recovery program 110A, 110B constructs a personal discourse gap recovery model (PDGRM) based on the discourse. The PDGRM may be a machine learning model containing entries based on the analyzed discourse, and which accepts an input in the form of training data and provides an output in the form of a user's speech information. Each PDGRM may pertain to a single user, and may contain the dictionaries, collocations, and speaking rate of a person.

At 206, the gap recovery program 110A, 110B initiates a discourse gap recovery function (or DGRF) based on the output of the PDGRM. The DGRF may be a software component which accepts the PDGRM of a user, as well as recorded discourse from a recent or in-progress conversation where the system identifies gaps; the DGRF may analyze the discourse, utilize the conversational model of the user as represented by the PDGRM to extrapolate one or more words that the user might have said based on the duration of the gap and the discourse of the user prior to, and possibly subsequent to, the gap.

At 208, the gap recovery program 110A, 110B detects gaps in an audio conversation. The gap recovery program 110A, 110B may detect a gap in the discourse by monitoring connection information of a client device, for example during an audio call, and inferring from the connection information when reception has been lost. The gap recovery program 110A, 110B may monitor the audio from the call for gaps. The gap recovery program 110A, 110B may infer the presence of a gap if the audio goes silent, or where the user goes silent, for more than a threshold duration, where the threshold duration may be determined based on information inferred from or contained within the user's PDGRM. In some embodiments, the system may identify gaps based on a combination of network activity and audio gaps, for instance by flagging gaps where both network activity reached a threshold level, and where audio levels went silent for more than a threshold duration.

At 210, the gap recovery program 110A, 110B repairs one or more detected gaps in the audio conversation using the DGRF. The DGRF may repair the detected gaps in the audio conversation by analyzing the discourse and utilizing the conversational model of the user as represented by the PDGRM to extrapolate one or more words that the user might have said based on the duration of the gap and the discourse of the user prior to, and possibly subsequent to, the gap. These extrapolated words may combine with the discourse prior to and/or subsequent to the gap to produce a completed phrase or sentence. In some embodiments, the DGRF may identify participants to the call utilizing speech recognition technology in order to determine which participant was interrupted by the gap, in order to use the PDGRM corresponding to the interrupted user in formulating repaired dialogue. In situations where gap recovery program 110A, 110B has detected a gap but the gap is below a threshold duration, where the threshold duration is a duration short enough that gap recovery program 110A, 110B may not have time to repair the gap or short enough that a user may not require gap recovery to understand the missed speech, gap recovery program 110A, 110B may not repair the speech. In some embodiments, gap recovery program 110A, 110B may utilize speech processing to determine whether a detected gap has interrupted the speech of a participant, for instance by analyzing the waveforms of the call audio to determine where audio drops to zero from some nonzero level above a certain minimum threshold representing an audio level likely to correspond with human speech, on either side of the gap; gap recovery program 110A, 110B may accordingly repair the gap responsive to determining that the gap did interrupt speech. The DGRF may utilize text to speech to convert the repaired dialogue into an audio format and may splice the audio into the call. In some embodiments, the DGRF may utilize speech processing to mimic a user's voice in playing the repaired audio. In some embodiments, the DGRF may send a text or popup notification with the repaired dialogue.

Figure 3:
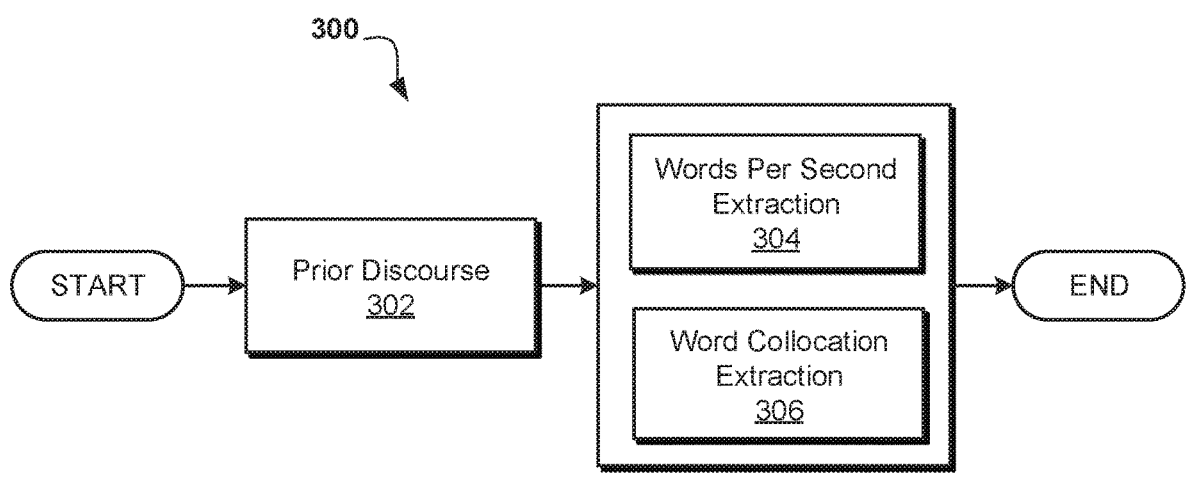
FIG. 3 is an operational flowchart illustrating an analysis algorithm that returns a model, according to at least one embodiment.

Referring now to FIG. 3, an operational flowchart illustrating an analysis algorithm 300 that returns a model is depicted according to at least one embodiment; gap recovery program 110A, 110B accepts prior discourse at 302. The prior discourse may be spoken conversations conducted at an earlier time, recorded in the form of audio, or in the form of a text-based transcript, which correspond with a single user. The discourse corresponds to a user if the user was a participant in the call and spoke one or more words during the call. In embodiments where prior discourse takes the form of a text-based transcript, the prior discourse may be annotated with information representing temporal dimensions of the spoken conversation, such as the duration of the gap between each word, current time at intervals during the conversation, time each word or sentence took to say, et cetera.

At 304, the gap recovery program 110A, 110B may perform words per second extraction. The gap recovery program 110A, 110B performs analysis of the prior discourse in order to extract the rate at which a user speaks, for example in the form of words spoken per second; the gap recovery program 110A, 110B may extract the speaking rate from the audio or from annotations attached to the text-based transcript.

At 306, the gap recovery program 110A, 110B performs word collocation extraction. The gap recovery program 110A, 110B may perform analysis on the prior discourse to extract word collocation information. Word collocation information may include which words appear adjacent to the subject word in a sentence. While some embodiments may employ one-word collocations, others may involve multiple-word collocations; for instance, an embodiment may analyze for three-word collocations, where gap recovery program 110A, 110B records words appearing within three words of the subject word.

Figure 4:
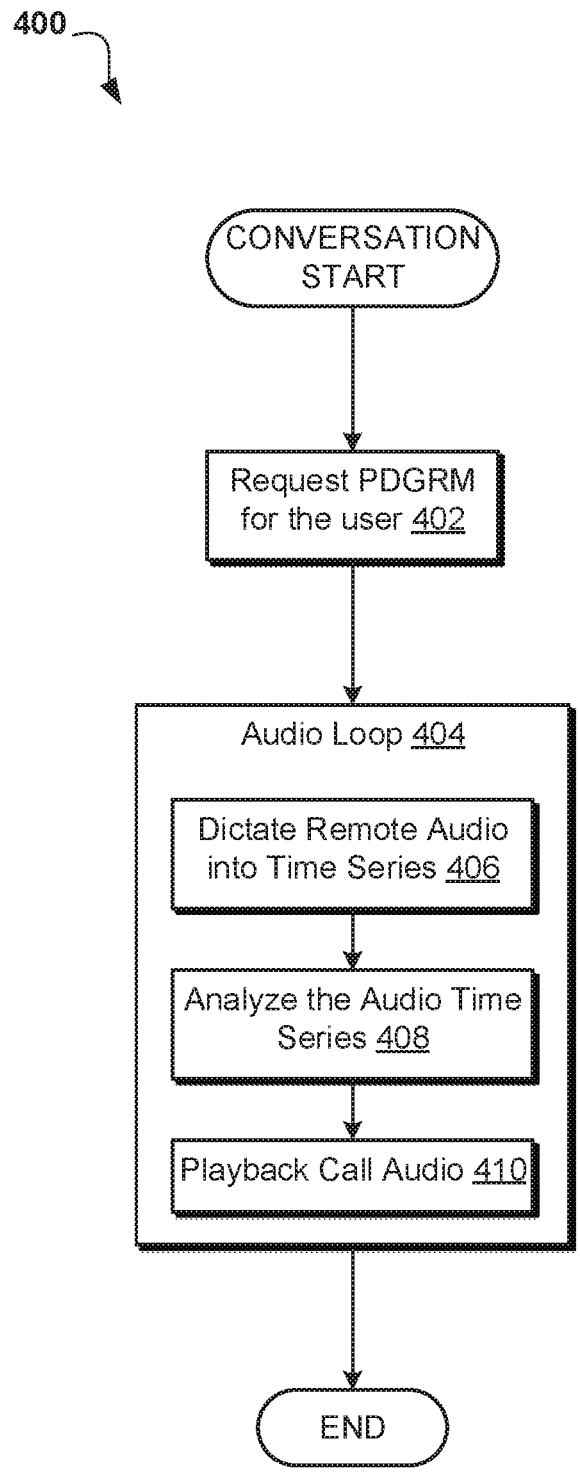
FIG. 4 is an operational flowchart illustrating a two-way communication discourse gap recovery process according to at least one embodiment.

Referring now to FIG. 4, an operational flowchart illustrating a two-way communication discourse gap recovery process 400 is depicted according to at least one embodiment. At 402, after a conversation has started on or accessible to one or more client computing devices 102 hosting gap recovery program 110A, 110B, the gap recovery program 110A, 110B may requests the PDGRM for the user. The gap recovery program 110A, 110B may repairs gaps in dialogue for all participants in a call except for the local participant who is participating in the call via the client computing device 102 which is hosting an instance or part of an instance of the gap recovery program 110A, 110B; the local participant does not need to have her own dialogue repaired in the event of an interruption. Consequently, the gap recovery program 110A, 110B may need PDGRMs stored locally on the client computing device 102 for each participant in the call, or at least as many as possible, so that repaired dialogue may be constructed for any participant that is interrupted by a gap. As such, if the gap recovery program 110A, 110B does not possess PDGRMs for a participant in the call besides the local participant, gap recovery program 110A, 110B may request that participant's PDGRM, for instance from a server 112, database 116, or client device 102 being used by another participant in the call. In some embodiments, PDGRMs may be stored in a server 112 for distribution to client computing devices 102. In some embodiments, client computing devices 102 may store PDGRMs locally, and in others may delete PDGRMs after a call and request PDGRMs anew for each call, or may only store PDGRMs of users who frequently participate in calls with the local participant. In some embodiments, if gap recovery program 110A, 110B does not acquire the PDGRM of a participant on the call, gap recovery program 110A, 110B may begin to construct a PDGRM corresponding to that user based on the discourse within the call audio.

At audio loop 404, gap recovery program 110A, 110B may execute a looping series of steps for the duration of the conversation, as follows: at 406, gap recovery program 110A, 110B may dictate remote audio into time series. The gap recovery program 110A, 110B may capture audio of the user's conversation in real time or near-real-time and record the words and the gaps between the words, for instance in the form of a time series, which may be a representation of the audio annotated with time stamps onto each word or gap. In embodiments where the gap recovery program 110A, 110B does not receive or does not have access to a PDGRM of the user or another participant in the call, gap recovery program 110A, 110B may store the time series of the remote audio as training data to build a PDGRM for that user or participant.

At 408, gap recovery program 110A, 110B may analyze the audio time series. Here gap recovery program 110A, 110B analyzes the dictated audio time series searching for gaps. The gap recovery program 110A, 110B may also monitor network communication quality time series pertaining to the call and cross-reference the network communication quality against the dictated audio time series to check for gaps.

At 410, gap recovery program 110A, 110B may playback call audio. Here, the gap recovery program 110A, 110B may introduce a delay into the conversation between when client computing device 102 receives call data and when client computing device 102 plays, or causes to be played, the corresponding audio. The delay may serve to provide a buffer of time for gap recovery program 110A, 110B, because a client computing device must first detect a gap before it can fill the gap, which is not an instantaneous process. The length of the delay may be based on the processing time required to identify a gap and supply a correction, and/or may be based on the length of the detected gap. The gap recovery program 110A, 110B may play repaired discourse using the DGRF as part of the call audio playback. In cases where the gap is too short to fit the repaired discourse, gap recovery program 110A, 110B may also speed up the call audio in order to produce a gap large enough to accommodate the repaired discourse. In some embodiments, gap recovery program 110A, 110B may maintain the audio delay for the entire duration of the call, or may only introduce the audio delay when a gap is discovered. The audio delay may be constant in duration, or may be dynamically modified based on factors such as the length of the gap, duration of processing time, server load, et cetera. An example of the implementation of the delay is explained below with respect to FIG. 5.

Figure 5:
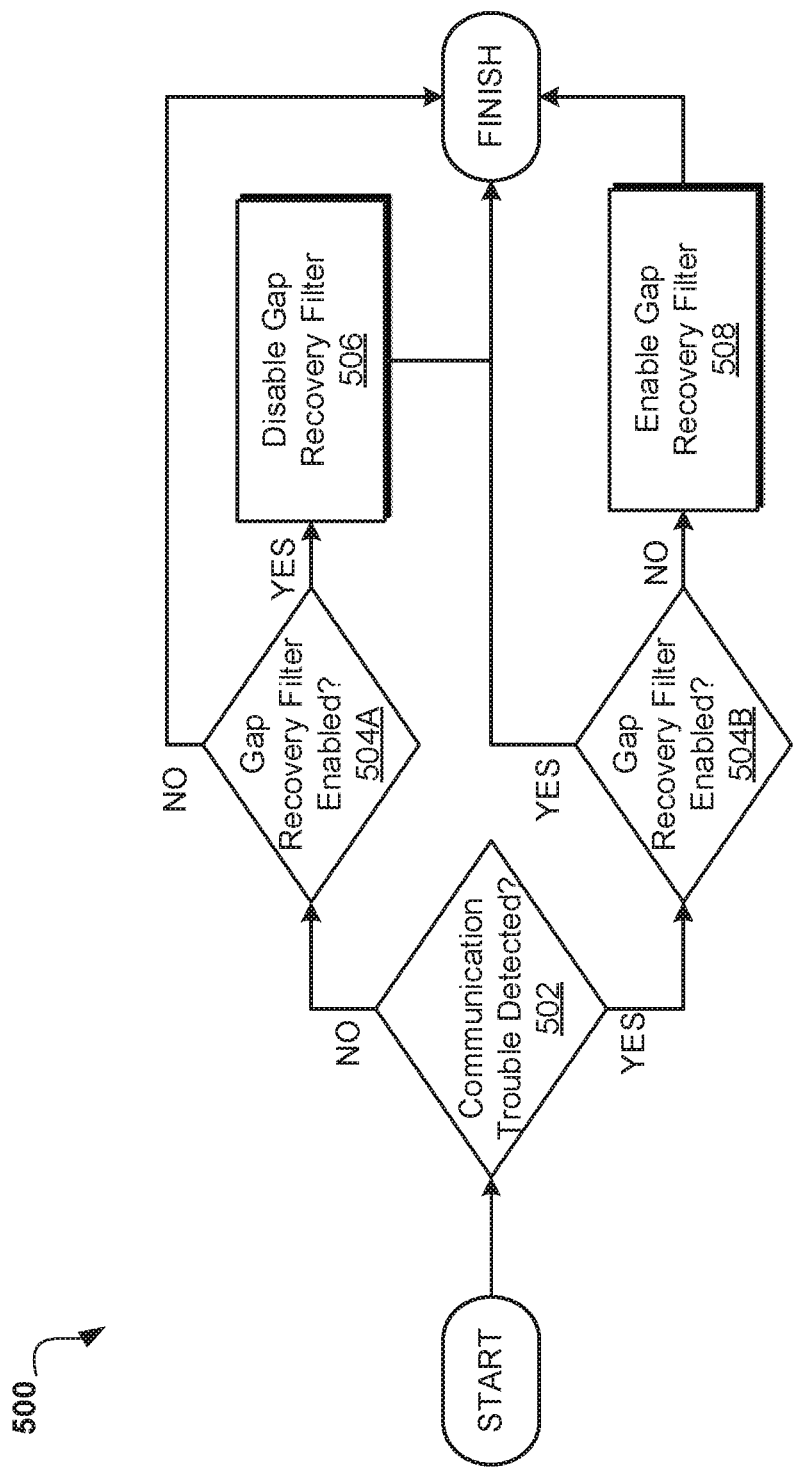
FIG. 5 is an operational flowchart illustrating an analyze audio time series subprocess according to at least one embodiment.

Referring now to FIG. 5, an operational flowchart illustrating an analyze audio time series subprocess 500 is depicted according to at least one embodiment. At 502, gap recovery program 110A, 110B determines whether communications trouble has been detected. The gap recovery program 110A, 110B may determine whether communications trouble has been detected by monitoring network activity. If communications trouble is not detected (step 502, "NO" branch), gap recovery program 110A, 110B may proceed to step 504A to determine whether the gap recovery filter is enabled. If communications trouble is detected (step 502, "YES" branch), gap recovery program 110A, 110B may proceed to step 504B to determine whether the gap recovery filter is enabled.

At step 504A, gap recovery program 110A, 110B determines whether the gap recovery filter is enabled. The gap recovery filter may be an audio subprocess or functionality that applies a delay to call audio when enabled, and when disabled applies no delay and leaves call audio unchanged. If the gap recovery filter is enabled, (step 504A, "YES" branch), gap recovery program 110A, 110B may proceed to step 506 to disable the gap recovery filter. If the gap recovery filter is not enabled (step 504A, "NO" branch), gap recovery program 110A, 110B may terminate.

At step 504B, gap recovery program 110A, 110B determines whether the gap recovery filter is enabled. The gap recovery filter may be an audio subprocess or functionality that applies a delay to call audio when enabled, and when disabled applies no delay and leaves call audio unchanged. If the gap recovery filter is not enabled, (step 504B, "NO" branch), gap recovery program 110A, 110B may proceed to step 508 to enable the gap recovery filter. If the gap recovery filter is enabled (step 504A, "YES" branch), gap recovery program 110A, 110B may terminate.

At 506, gap recovery program 110A, 110B may disable the gap recovery filter. Disabling the gap recovery filter will remove the delay, and allow call audio to return to its default state.

At 508, gap recovery program 110A, 110B may enable the gap recovery filter. Enabling the gap recovery filter may introduce a delay between when the call audio is received by client computing device 102 and when it is played to the local call participant.

Figure 6:
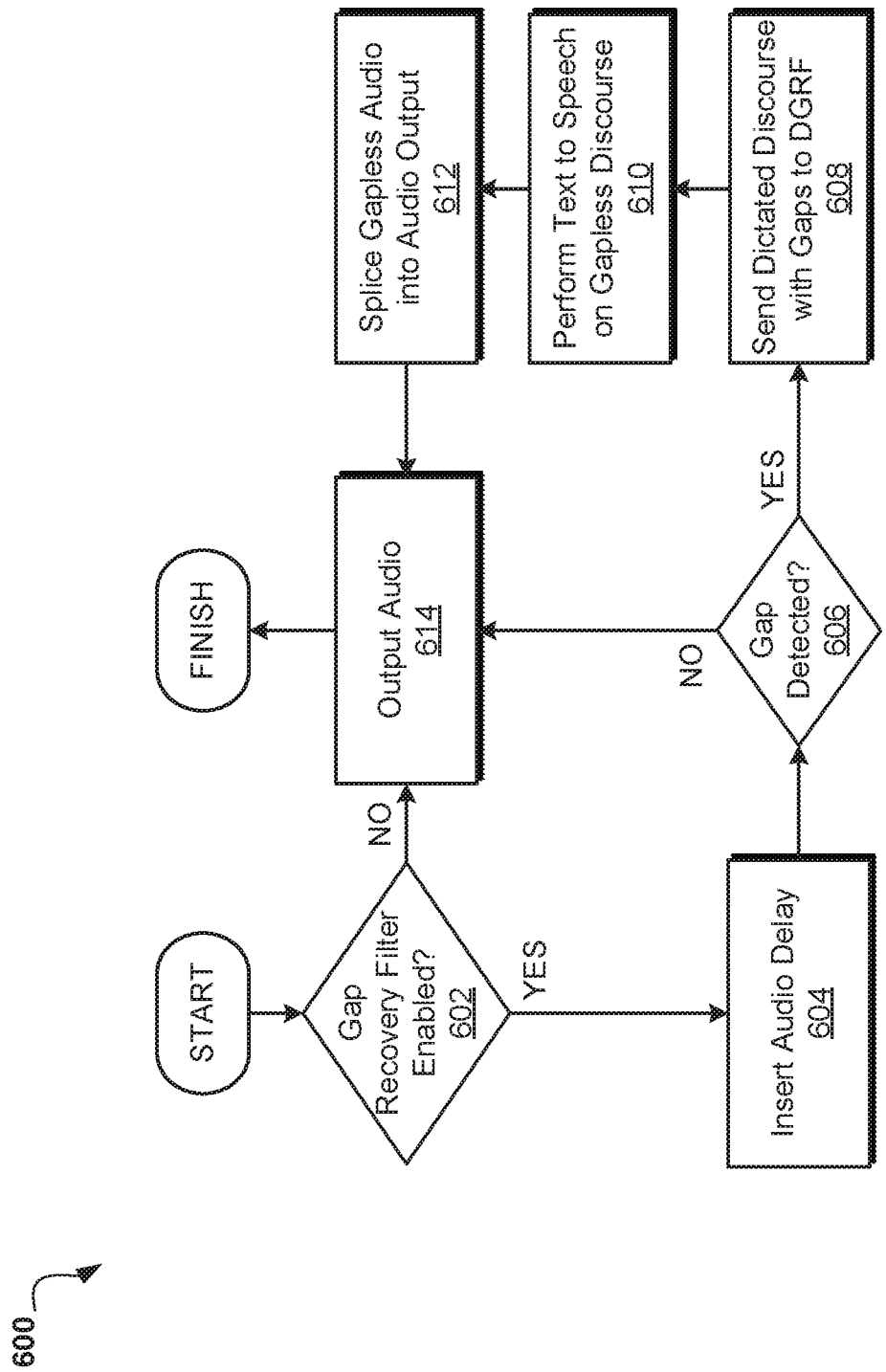
FIG. 6 is an operational flowchart illustrating a playback audio subprocess according to at least one embodiment.

Referring now to FIG. 6, an operational flowchart illustrating a playback audio subprocess 600 is depicted according to at least one embodiment, where the playback audio subprocess 600 may be a subprocess of gap recovery program 110A, 110B. At 602, playback audio subprocess 600 determines whether the gap recovery filter is enabled. If the gap recovery filter is enabled, (step 602, "YES" branch), playback audio subprocess 600 may proceed to step 604 to insert an audio delay. If the gap recovery filter is not enabled (step 602, "NO" branch), playback audio subprocess 600 may proceed to step 614 to output audio.

At 604, playback audio subprocess 600 may insert an audio delay. The delay may serve to provide a buffer of time for gap recovery program 110A, 110B to detect and repair a gap. The length of the delay may be based on the processing time required to identify a gap and supply a correction, and/or may be based on the length of the detected gap.

At 606, playback audio subprocess 600 may determine whether a gap has been detected, such as by querying gap recovery program 110A, 110B. If a gap is detected, (step 606, "YES" branch), playback audio subprocess 600 may proceed to step 608 to send dictated discourse with gaps to the DGRF. If a gap is not detected (step 606, "NO" branch), playback audio subprocess 600 may proceed to step 614 to output audio.

At 608, playback audio subprocess 600 may send dictated discourse with gaps to the DGRF. The playback audio subprocess 600 may record the discourse of the call in real time or near-real-time.

At 610, playback audio subprocess 600 may perform text to speech on gapless discourse. Here, playback audio subprocess 600 may receive gapless discourse from the DGRF, where the gapless discourse is repaired call dialogue. The playback audio subprocess 600 may utilize text to speech technology to convert the gapless discourse into audio format.

At 612, playback audio subprocess 600 may splice gapless audio into audio output. Here, playback audio subprocess 600 may utilize audio splicing techniques to integrate the gapless discourse into the call audio. The playback audio subprocess 600 may be able to splice the gapless discourse into the call audio during the audio delay, such that the repaired discourse is available to be played by the point that natural dialogue would have naturally occurred during the conversation if not for the gap.

At 614, playback audio subprocess 600 may output audio. Here, the playback audio subprocess 600 may play the call audio, which may include the repaired audio, to the local participant using speakers attached to, integrated with, controlled by, or in communication with client computing device 102 using any audio playback technique.

It may be appreciated that FIGS. 2-6 respectively provide only illustrations of individual implementations and do not imply any limitations with regard to how different embodiments may be implemented. Many modifications to the depicted environments may be made based on design and implementation requirements.

Figure 7:
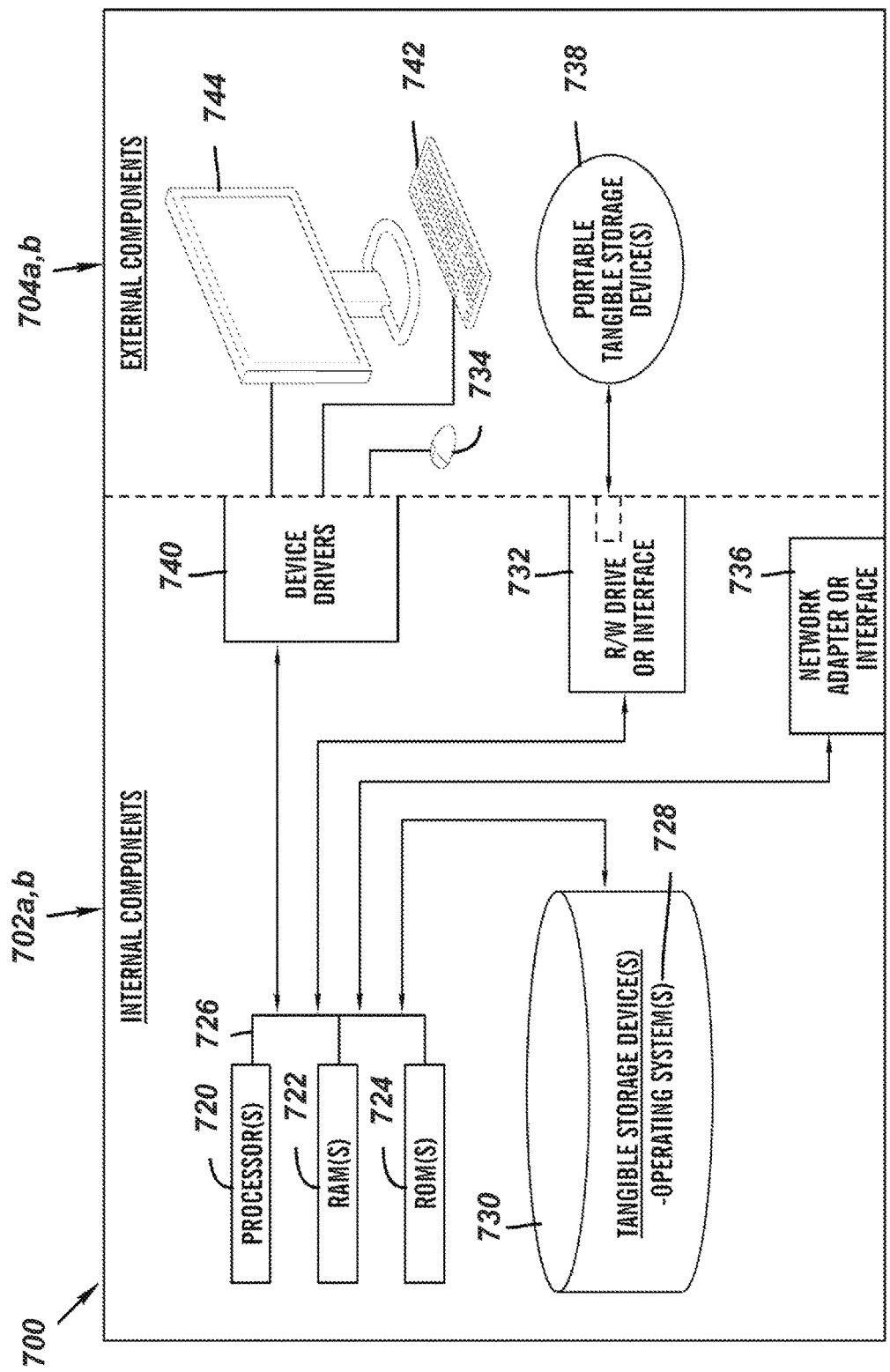
FIG. 7 is a block diagram of internal and external components of computers and servers depicted in FIG. 1 according to at least one embodiment.

FIG. 7 is a block diagram 700 of internal and external components of the client computing device 102 and the server 112 depicted in FIG. 1 in accordance with an embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

The data processing system 702, 704 is representative of any electronic device capable of executing machine-readable program instructions. The data processing system 702, 704 may be representative of a smart phone, a computer system, PDA, or other electronic devices. Examples of computing systems, environments, and/or configurations that may represented by the data processing system 702, 704 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 702a,b and external components 704a,b illustrated in FIG. 7. Each of the sets of internal components 702 include one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the gap recovery program 110A in the client computing device 102, and the gap recovery program 110B in the server 112 are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 702a,b also includes a R/W drive or interface 732 to read from and write to one or more portable computer-readable tangible storage devices 738 such as a CD-ROM, DVD, memory stick, magnetic tape, magnetic disk, optical disk or semiconductor storage device. A software program, such as the gap recovery program 110A, 110B, can be stored on one or more of the respective portable computer-readable tangible storage devices 738, read via the respective R/W drive or interface 732, and loaded into the respective hard drive 730.

Each set of internal components 702a,b also includes network adapters or interfaces 736 such as a TCP/IP adapter cards, wireless Wi-Fi interface cards, or 3G or 4G wireless interface cards or other wired or wireless communication links. The gap recovery program 110A in the client computing device 102 and the gap recovery program 110B in the server 112 can be downloaded to the client computing device 102 and the server 112 from an external computer via a network (for example, the Internet, a local area network or other, wide area network) and respective network adapters or interfaces 736. From the network adapters or interfaces 736, the gap recovery program 110A in the client computing device 102 and the gap recovery program 110B in the server 112 are loaded into the respective hard drive 730. The network may comprise copper wires, optical fibers, wireless transmission, routers, firewalls, switches, gateway computers and/or edge servers.

Each of the sets of external components 704a,b can include a computer display monitor 744, a keyboard 742, and a computer mouse 734. External components 704a,b can also include touch screens, virtual keyboards, touch pads, pointing devices, and other human interface devices. Each of the sets of internal components 702a,b also includes device drivers 740 to interface to computer display monitor 744, keyboard 742, and computer mouse 734. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
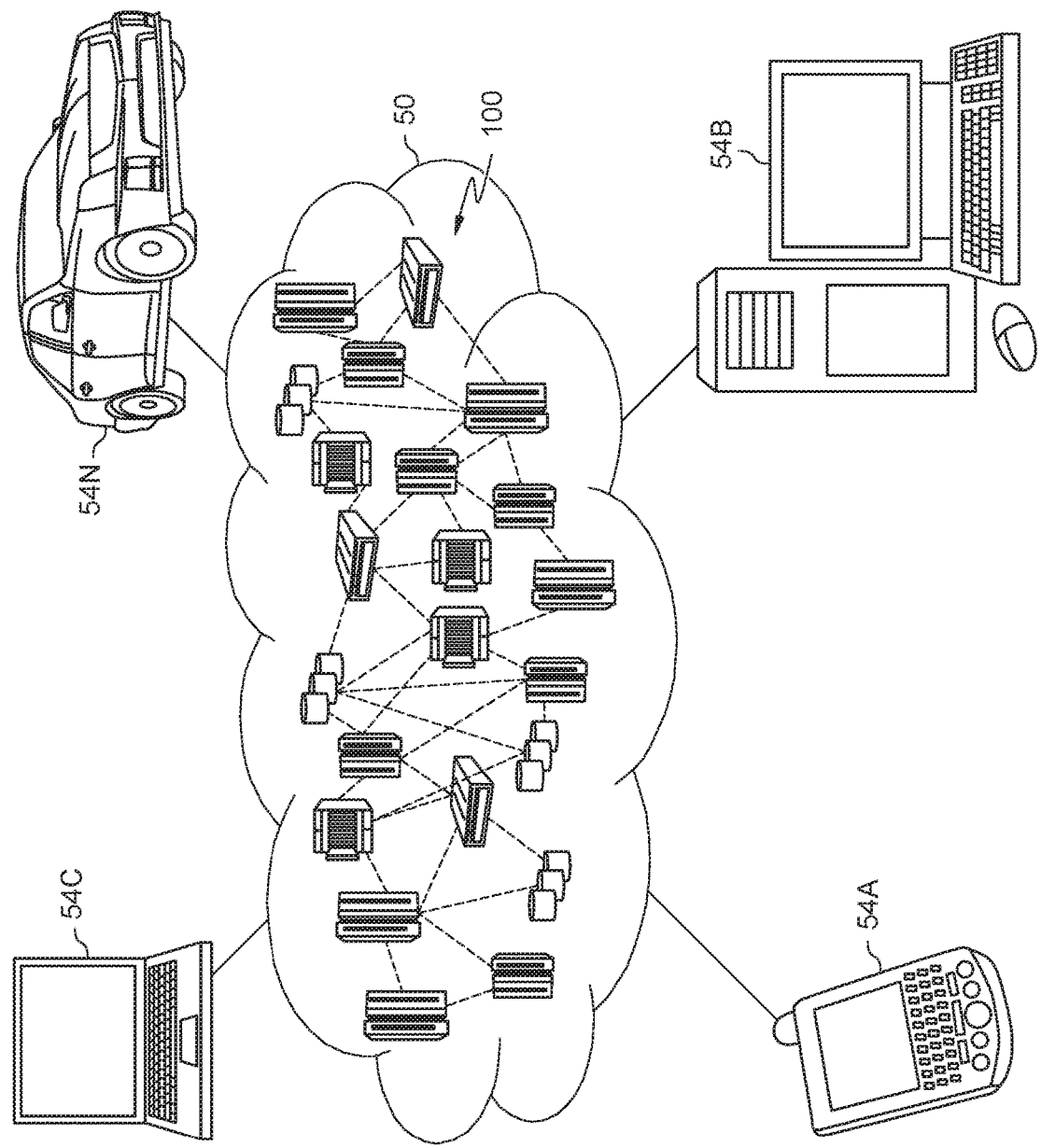
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 9:
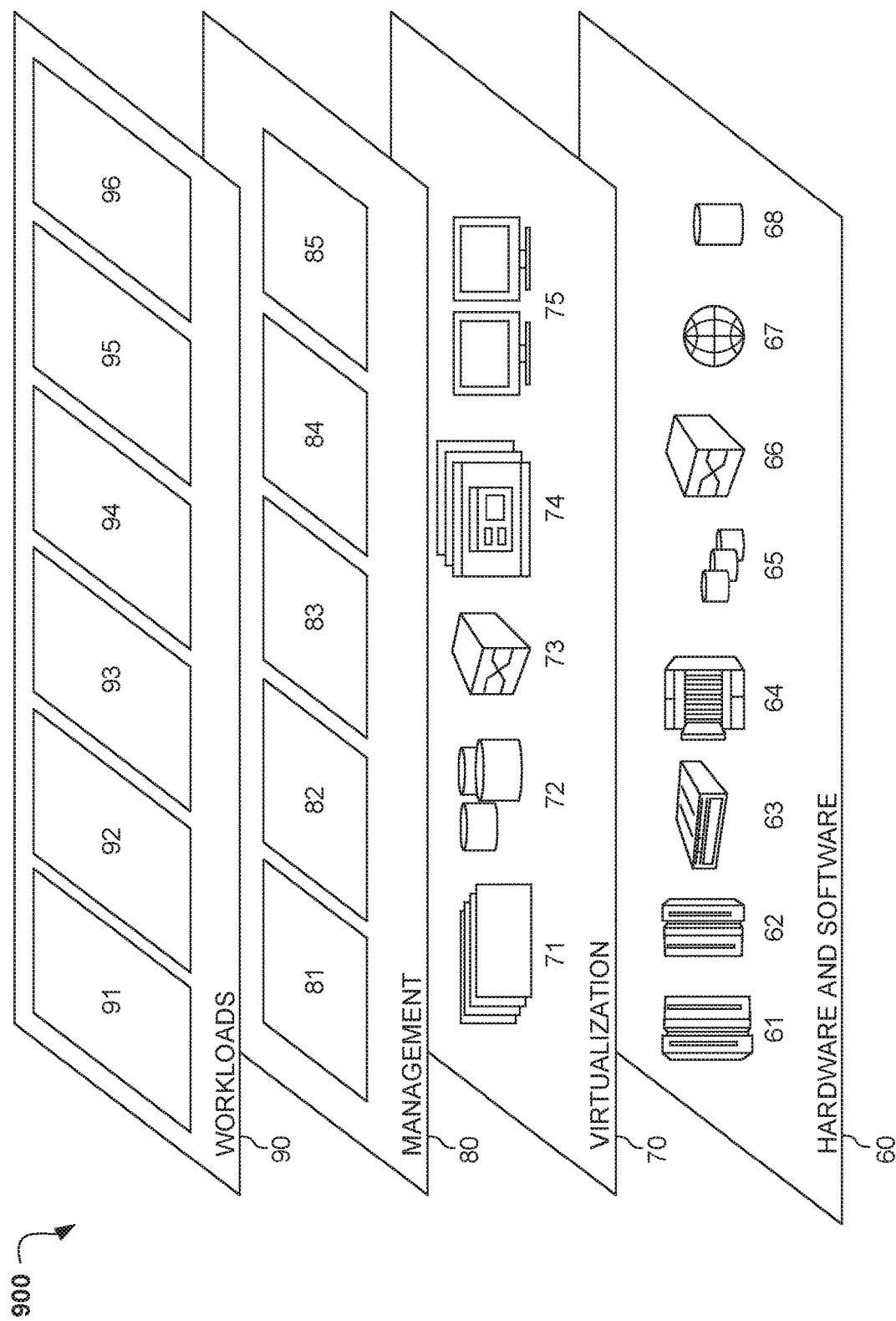
FIG. 9 depicts abstraction model layers according to an embodiment of the present invention.

Referring now to FIG. 9, a set of functional abstraction layers 900 provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and gap recovery 96. The gap recovery 96 may be a function enabled to utilize a trained machine learning model to identify and repair gaps in a call.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for repairing gaps in discourse during a call, the method comprising:
   detecting a gap in the call;
   constructing repaired dialogue to fill the gap in the call by extrapolating one or more words that a user might have said based on at least word collocation data extracted from prior discourse of the user and a duration of the gap;
   only when the gap is detected, creating a delay between receiving a plurality of call audio and outputting the plurality of call audio, wherein the delay is based on the length of the detected gap; and
   inserting the repaired dialogue into the call during the delay.

2. The method of claim 1, wherein extrapolating one or more words that a user might have said is further based on a personal discourse gap recovery model (PDGRM) which comprises the word collocation data associated with the user.

3. The method of claim 1, wherein the gap is detected based on a network activity falling below a threshold value and an audio level going silent for more than a threshold duration.

4. The method of claim 1, wherein detecting a gap in the call is based on a speaking rate of the user.

5. The method of claim 1, wherein constructing repaired dialogue is further based on determining that the user was interrupted by the gap.

6. The method of claim 1, wherein the word collocation data comprises up to three word collocations.

7. A computer system for repairing gaps in discourse during a call, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   detecting a gap in the call;
   constructing repaired dialogue to fill the gap in the call by extrapolating one or more words that a user might have said based on at least word collocation data extracted from prior discourse of the user and a duration of the;

only when the gap is detected, creating a delay between receiving a plurality of call audio and outputting the plurality of call audio, wherein the delay is based on the length of the detected gap; and inserting the repaired dialogue into the call during the delay.

8. The computer system of claim 7, wherein extrapolating one or more words that a user might have said is further based on a personal discourse gap recovery model (PDGRM).

9. The computer system of claim 7, wherein the gap is detected based on a network activity falling below a threshold value and an audio level going silent for more than a threshold duration.

10. The computer system of claim 7, wherein detecting a gap in the call is based on a speaking rate of the user.

11. The computer system of claim 7, wherein constructing repaired dialogue is further based on determining that the user was interrupted by the gap.

12. The computer system of claim 7, wherein the word collocation data comprises up to three word collocations.

13. A computer program product for repairing gaps in discourse during a call, the computer program product comprising:

one or more computer-readable tangible storage medium and program instructions stored on at least one of the one or more tangible storage medium, the program instructions executable by a processor to cause the processor to perform a method comprising:

detecting a gap in the call;

constructing repaired dialogue to fill the gap in the call by extrapolating one or more words that a user might have said based on at least word collocation data extracted from prior discourse of the user and a duration of the gap;

only when the gap is detected, creating a delay between receiving a plurality of call audio and outputting the plurality of call audio, wherein the delay is based on the length of the detected gap; and inserting the repaired dialogue into the call during the delay.

14. The computer program product of claim 13, wherein extrapolating one or more words that a user might have said is further based on a personal discourse gap recovery model (PDGRM) which comprises the word collocation data associated with the user.

15. The computer program product of claim 13, wherein the gap is detected based on a network activity falling below a threshold value and an audio level going silent for more than a threshold duration.

16. The computer program product of claim 13, wherein detecting a gap in the call is based on a speaking rate of the user.

17. The computer program product of claim 13, wherein constructing repaired dialogue is further based on determining that the user was interrupted by the gap.

* * * * *